Patented Nov. 15, 1927.

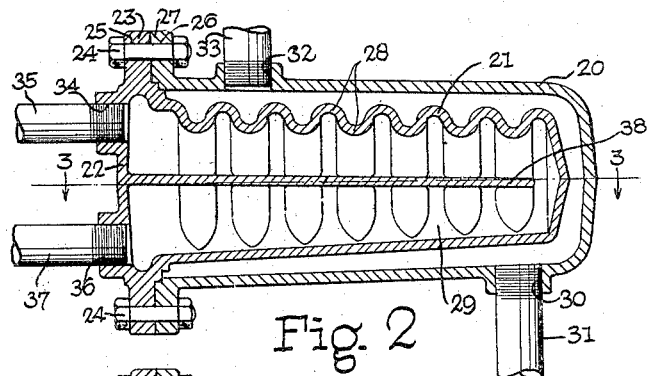
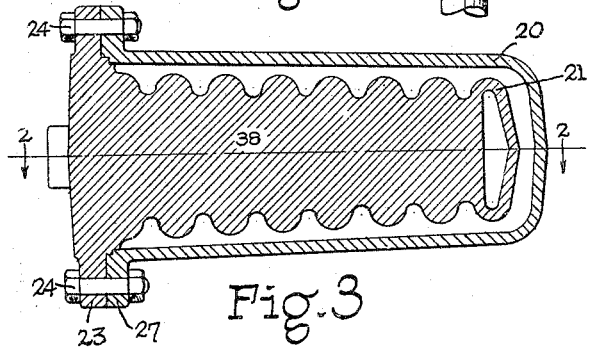
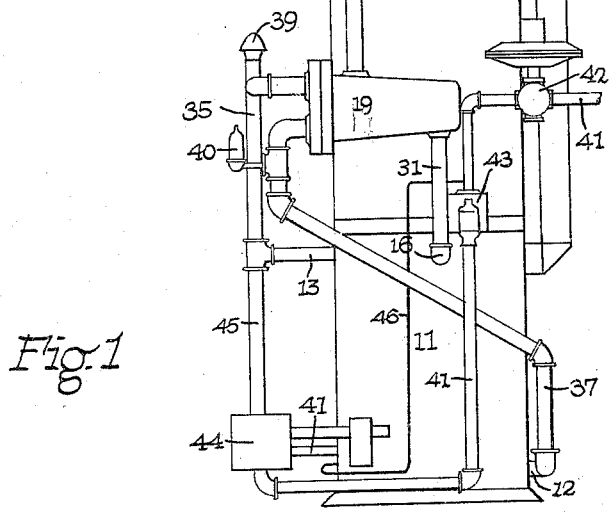

1,649,097

UNITED STATES PATENT OFFICE.

CHARLES L. BRYANT, OF CLEVELAND, OHIO.

HEATING.

Application filed August 25, 1924. Serial No. 734,041.

My invention relates to heating and the principal object of my invention is to provide new and useful heating apparatus of the type and for the purposes herein disclosed. In the drawings accompanying this specification and forming a part thereof I have shown, for purposes of illustration, one from which my invention may assume. In these drawings:

Figure 1 is a side elevation of this illustrative embodiment of my invention,

Figure 2 is a vertical section through the heat transfer means shown generally in Figure 1 and taken on the line 2—2 of Figure 3, while Figure 3 is a section on the line 3—3 of Figure 2.

The device herein shown comprises a boiler 11 provided with an inlet 12 and an outlet 13, and a tank 14 provided with a circulating fluid inlet 15, a circulating fluid outlet 16, a conduit 17 arranged to be connected to the supply main, and a conduit 18 arranged to be connected to the supplied system.

Interposed between the boiler section and the tank section is a heat transfer means 19 herein shown as comprising a tapered outer casing 20 having its larger end open, and a correspondingly tapered inner receptacle 21 spaced from the outer receptacle 20 and having its larger end closed by an integral end plate 22 provided with a flange 23 arranged to overlie and close the open end of the outer receptacle 20 and to be secured in this closing position by means of bolts 24 passing through apertures 25 in the flange 23 and cooperating apertures 26 in a flange 27 formed integral with the outer receptacle 20. The walls of the inner receptacle 21 are formed corrugated as shown at 28 except at the bottom portion where the corrugations are interupted by a straight downwardly inclined surface 29 arranged to afford a drain to prevent the accumulation of condensation in the pockets which would otherwise be formed by the corrugations 28.

The outer receptacle 21 is formed with an inlet aperture 30 connected by means of a conduit 31 with the outlet 16 of the tank 14, and an outlet aperture 32 connected by means of the conduit 33 with the inlet 15 of the tank 14. Similarly, the end plate 22 of the inner receptacle 21 is formed with an inlet aperture 34 connected by means of a conduit 35 with the outlet 13 of the boiler 11, and an outlet aperture 36 connected by means of a duct 37 with the inlet 12 of the boiler 11. The inner receptacle 21 is also provided with a baffle 38 arranged to prevent flow directly between the inlet aperture 34 and the outlet aperture 36, the conduit 35 is provided with a suitable safety valve 39, and the conduit 37 is provided with an air escape valve 40.

The boiler 11 is heated by means of a fluid fuel burner supplied with fuel through a conduit 41 preferably intercepted by a pressure reducing valve 42 arranged to maintain an operating pressure lower than the minimum likely to occur in the fuel supply main and thereafter intercepted by a thermostatic valve 43 of any suitable construction whereby the valve operates in response to change in temperature of the fluid within the tank 14 to decrease or terminate the flow of fuel upon increase in the temperature of the fluid in the tank 14 and to increase or recommence the flow of fuel upon decrease in temperature of this fluid. The fuel supply duct 41 is also intercepted by means responsive to conditions in the boiler fluid system which means may comprise, when the fluid in this system is not vaporized, a second thermostat similar to the thermostat 43 and immersed in the fluid of this system, and, when the fluid in this system is vaporized, as is herein contemplated, a pressure responsive valve 44, connected to the conduit 35 leading from the boiler 11 to the heat transfer means 19 by means of a branch conduit 45, and thus made responsive to the pressure within the conduit 35. This pressure responsive valve 44 may be of any well known construction whereby increase in pressure in the conduit 35 will decrease or terminate the flow of fuel to the heating element while decrease in pressure in the conduit 35 will correspondingly increase or recommence the flow of fuel. With this control I utilize a pilot light supplied through a branch conduit 46 intercepting the main fuel feed conduit 41 ahead of the thermostatic valve 43.

The construction of the boiler 11, tank 14, thermostat 43, and various other portions of the device herein shown, is more fully illustrated in my co-pending application executed and filed concurrently herewith and bearing Serial Number 734,039.

It will be understood from the above description that fluid in the boiler system will flow from the boiler outlet 13 through the conduit 35, the inlet aperture 34 of the heat transfer means 19, the inner receptacle 21 of the heat transfer means 19, the outlet aperture 36 of the heat transfer means 19, the connection conduit 37, and the boiler inlet 12, back to the boiler 11, and that the fluid in the tank system will originally enter the tank 14 through the conduit 17 and ultimately leave through the conduit 18 and will circulate between the tank 14 and the transfer means 19 through the tank outlet 16, connecting conduit 31, transfer means inlet aperture 30, outer receptacle 20 of the transfer means 19, outlet aperture 32, connecting conduit 33, and tank inlet 15 back into the tank 14.

It will be apparent from the above description that I have provided a heater wherein fuel supply is controlled by both the temperature of the fluid within the tank and the pressure of the fluid in the boiler system whereby the temperature of both of these fluids may be maintained below a predetermined maximum, for example, in either case, the temperature at which some chemical action occurs. It will also be apparent from the above description that I have provided a heater wherein the fluid to be heated is maintained away from the boiler and therefore not subjected to the greater temperature to which the fluid in the boiler must be subjected and that I have provided means for transferring the heat from one fluid to another which is simple in construction, occupies a minimum of space, is sufficient for the purpose, and may be readily dis-assembled to permit removal from the outer surface of the inner receptacle 21 of any material deposited thereon by the boiler fluid. Those skilled in the art will readily find additional advantages in the device herein illustrated and will also readily realize that the particular embodiments of my invention herein shown and described may be variously changed and modified without departing from the spirit of my invention or sacrificing the advantages thereof. It will therefore be understood that this disclosure is illustrative only and that my invention is not limited thereto.

I claim:

1. A fluid heated fluid heater comprising a tapered outer receptacle open at one end, and a cover for said receptacle arranged to close the open end of said receptacle and carrying formed integral with itself a second and smaller tapered receptacle arranged to be positioned, when said cover is in position closing said open end of said outer receptacle, within said outer receptacle and spaced therefrom, said smaller receptacle having its walls corrugated except for a drain strip along the lowest portion.

2. A fluid-heated fluid heater comprising a tapered outer receptacle open at its larger end, and a cover for said receptacle arranged to close the open end of said receptacle and carrying formed integral with itself a second and smaller tapered receptacle arranged to be positioned, when said cover is in position closing said open end of said outer receptacle, within said outer receptacle and spaced therefrom.

3. A fluid-heated fluid heater comprising a tapered outer receptacle open at its larger end, and a cover for said receptacle arranged to close the open end of said receptacle and carrying formed integral with itself a second and smaller tapered receptacle having corrugated walls and arranged to be positioned, when said cover is in position closing said open end of said outer receptacle, within said outer receptacle and spaced therefrom.

4. A fluid-heated fluid heater comprising an outer receptacle open at one end, and a cover for said receptacle arranged to close the open end of said receptacle and carrying formed integral with itself a second and smaller receptacle having its walls corrugated and arranged to be positioned, when said cover is in position closing said open end of said outer receptacle, within said outer receptacle and spaced therefrom.

5. A fluid-heated fluid heater comprising an outer receptacle open at one end, and a cover for said receptacle arranged to close the open end of said receptacle and carrying formed integral with itself a second and smaller receptacle arranged to be positioned, when said cover is in position closing said open end of said outer receptacle, within said outer receptacle and spaced therefrom.

In testimony whereof, I hereunto affix my signature.

CHARLES L. BRYANT.